(12) United States Patent
Crawford

(10) Patent No.: US 9,091,071 B2
(45) Date of Patent: Jul. 28, 2015

(54) FLEXIBLE DOWNSPOUT CONNECTOR APPARATUS

(75) Inventor: Carole Crawford, Ranburne, AL (US)

(73) Assignee: Carole Crawford, Ranburne, AL (US)

( * ) Notice: Subject to any disclaimer, the term of this patent is extended or adjusted under 35 U.S.C. 154(b) by 2335 days.

(21) Appl. No.: 11/805,778

(22) Filed: May 24, 2007

(65) Prior Publication Data

US 2008/0023959 A1   Jan. 31, 2008

Related U.S. Application Data

(63) Continuation-in-part of application No. 11/211,121, filed on Aug. 24, 2005, now abandoned.

(51) Int. Cl.
*F16L 21/00* (2006.01)
*E04D 13/08* (2006.01)

(52) U.S. Cl.
CPC ........ *E04D 13/08* (2013.01); *E04D 2013/0806* (2013.01)

(58) Field of Classification Search
USPC ............... 285/144.1, 148.1, 148.3, 148.18, 285/148.19, 148.21, 148.23, 148.2, 402, 285/901, 903, 921, 361, 396; 52/16; 137/615; 138/119, 121
See application file for complete search history.

(56) References Cited

U.S. PATENT DOCUMENTS

| | | | |
|---|---|---|---|
| 2,814,529 A | 11/1957 | Arnt | |
| 3,076,669 A | 2/1963 | Schlein | |
| 3,623,500 A | 11/1971 | Hoy | |
| 3,929,165 A | 12/1975 | Diebolt et al. | |
| 3,966,121 A | 6/1976 | Littman | |
| 4,650,224 A * | 3/1987 | Smith | 285/145.5 |
| 5,358,006 A | 10/1994 | Sweers | |
| 5,375,891 A | 12/1994 | Sicotte et al. | |
| 5,452,743 A * | 9/1995 | Rortvedt | 137/615 |
| 5,813,701 A | 9/1998 | Noble | |
| 5,915,735 A | 6/1999 | Noble | |
| 5,971,438 A * | 10/1999 | Johnson | 285/12 |
| 6,041,825 A | 3/2000 | Smith et al. | |
| 6,223,777 B1 * | 5/2001 | Smith et al. | 138/109 |
| 2003/0034651 A1 * | 2/2003 | Neubauer et al. | 285/396 |

FOREIGN PATENT DOCUMENTS

GB   1584365   2/1981
JP   52043126 A   4/1977

* cited by examiner

*Primary Examiner* — Aaron Dunwoody
(74) *Attorney, Agent, or Firm* — Foley & Lardner LLP

(57) ABSTRACT

A flexible downspout connector apparatus includes a flexible extension pipe, and a first adapter member and a second adapter member, both nested together at one end of the pipe. The first adapter member includes a connection portion for connecting to a downspout outlet end of a first size, and the second adapter member includes a connection portion for connecting to a downspout outlet of a second size. The second adapter member is releasably telescoped with respect to the first adapter member and may be left in place or removed at the option of the user to accommodate for different downspout outlet end sizes.

12 Claims, 7 Drawing Sheets

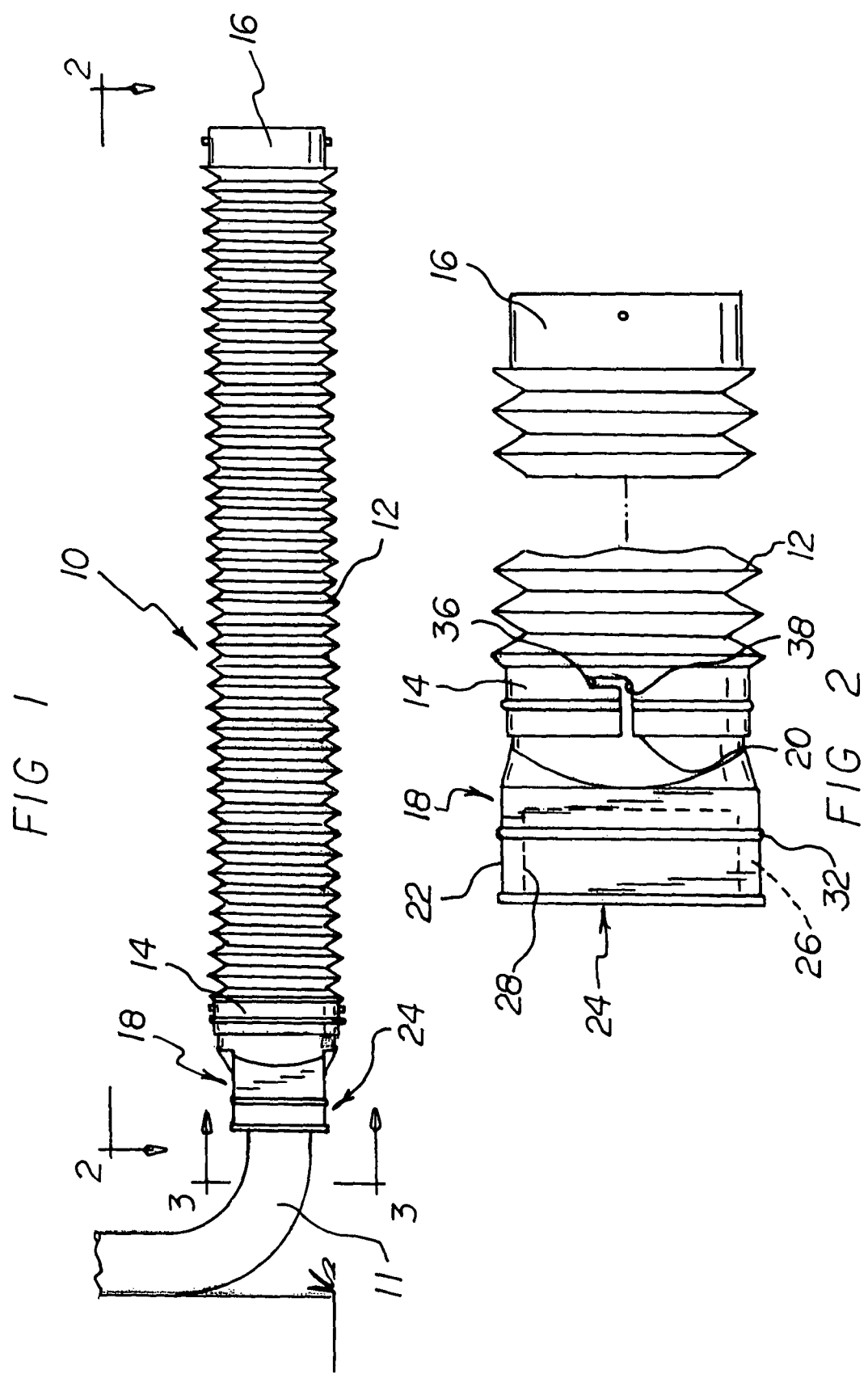

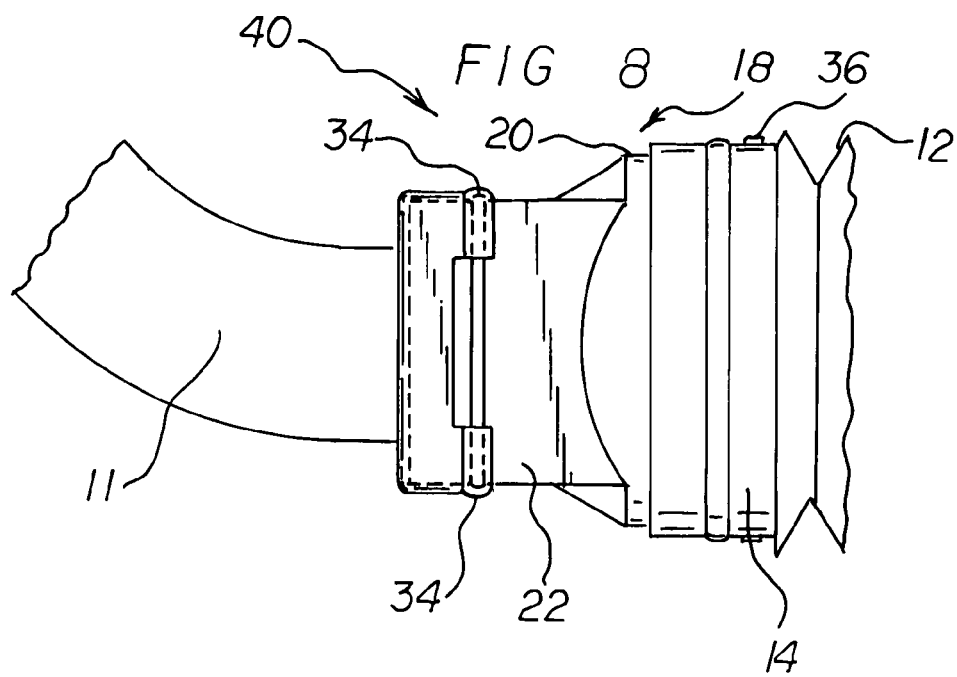
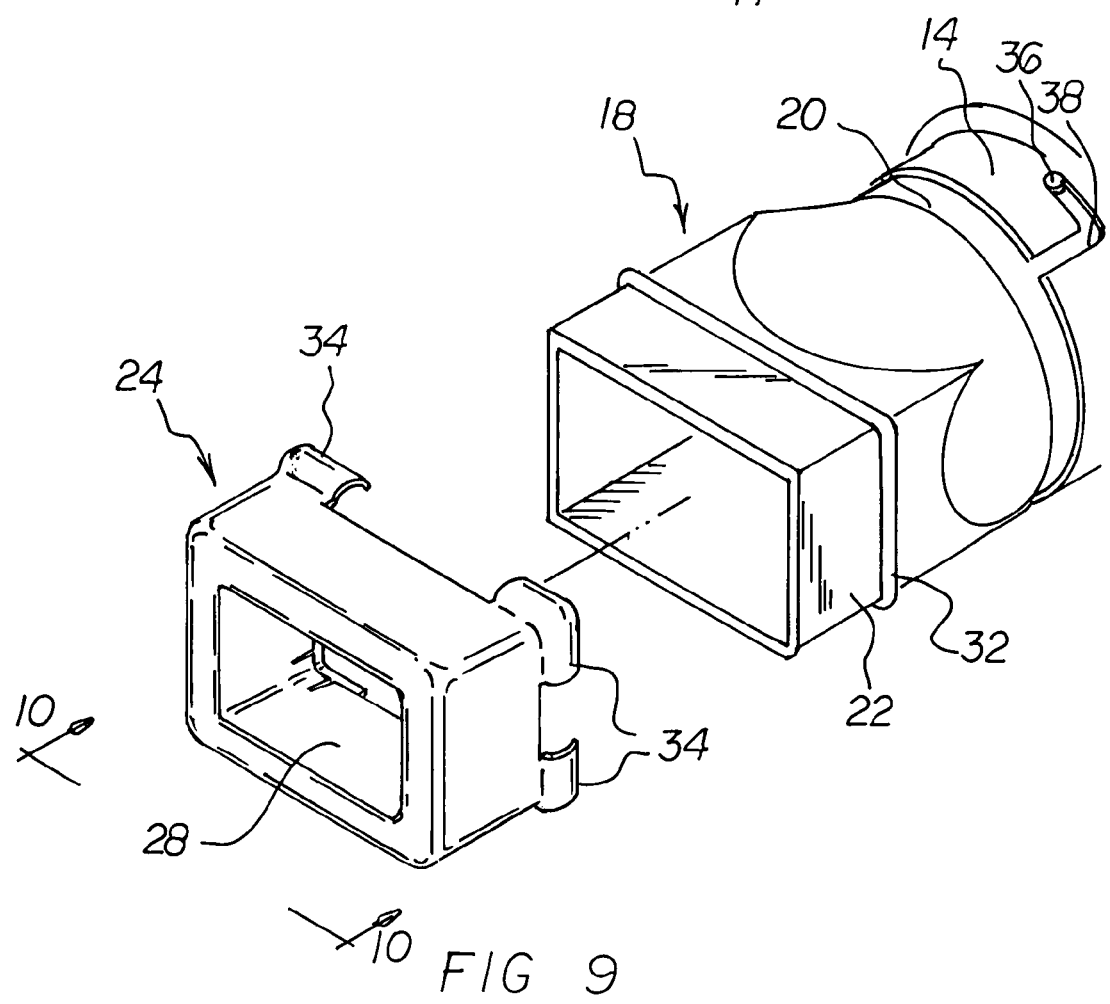

FLEXIBLE DOWNSPOUT CONNECTOR APPARATUS

RELATED APPLICATION

The present application is a continuation-in-part (CIP) of my prior U.S. patent application Ser. No. 11/211,121, filed Aug. 24, 2005 now abandoned.

BACKGROUND OF THE INVENTION

1. Field of the Invention

The present invention relates generally to flexible extensions for downspouts and, more particularly, to flexible downspout extensions that are especially adapted for connection to different downspouts having different sizes.

2. Description of the Prior Art

It is well known in the art to connect a flexible extension to a downspout in order to carry drainage water from a gutter and downspout to a location away from a building. In this respect, throughout the years, a number of innovations have been developed relating to flexible extensions connected to downspouts, and the following U.S. and foreign patents are representative of some of those innovations: U.S. Pat. Nos. 2,814,529, 3,076,669, 3,623,500, 3,929,165, 3,966,121, 5,358,006, 5,375,891, 5,813,701, 5,915,735, 6,041,825, 6,223,777, Japan 52043126, and Great Britain 1,584,365.

More specifically, U.S. Pat. No. 2,814,529 discloses a water dispensing device attached to a downspout. The device serves to extend the effective length of the downspout, to carry water drained from an overhead gutter to a location away from the close proximity of the building to which the gutter is attached. The devices is a flaccid, collapsible hose-like device that is attached to either a circular or rectangular downspout using a metal clamp. Such a flaccid, collapsible device is subject to cuts and tears. In this respect, it would be desirable if a device that is attached to a downspout have rigid features to help prevent cuts and tears of the downspout attachment.

U.S. Pat. No. 3,076,669 discloses a plastic bellows elbow that has two ends, a spigot end and a socket end. The upper coupling end has fixed dimensions for attachment to a fixed connector on the gutter. The bottom coupling end has fixed dimensions for attachment to a fixed connector on a downspout. Not all gutters have the same dimensions for couplings to downspouts. Also, not all downspouts have the same dimensions. Since not all downspouts have the same dimensions, it would be desirable if a device that is attached to a downspout have the capability to be adapted to downspouts having different dimensions.

U.S. Pat. No. 3,623,500 discloses a fluid conduit control that has a hose pipe connector of fixed dimensions to fit onto a fitting on a fluid container that has fixed dimensions. The fixed dimensions of both elements that are connected together do not allow for variations in the dimensions of either the hose pipe connector or the fitting on the fluid container.

U.S. Pat. No. 3,929,165 discloses a tubular hinge assembly. The front and rear ends of the tubular hinge assembly have fixed dimensions and are not adapted to connect to structures that have different fixed dimensions.

U.S. Pat. No. 3,966,121 discloses a flaccid and collapsible downspout extension that is similar to the downspout extension disclosed in U.S. Pat. No. 2,814,529, described above.

U.S. Pat. No. 5,358,006 discloses an adjustable downspout extension assembly that has an end for connecting to a downspout which has fixed dimensions. Moreover, the extension is rigid. The bottom end of this extension assembly has a pivotal connection to enable rotation of the rigid extension around the downspout. Rather than having a rigid extension connected by a pivotal connection to a downspout, it would be desirable if a downspout extension were flexible enough to be rotated around the downspout without requiring a pivotal connection. More specifically, it would be desirable if a downspout extension were rigid enough to withstand cuts and tears and, at the same time, were flexible enough to be swung around the downspout without the need for a pivotal connection between the extension and the downspout.

U.S. Pat. No. 5,375,891 discloses a universal connector for downspout drainage extensions, Clearly, the need to connect downspouts having one type of cross-section with extensions having another type of cross-section is addressed. For example, FIG. 5A shows a configuration for connecting a square downspout with a round drainage extension. Conversely, FIG. 5B shows a configuration for connecting a round downspout with a square drainage extension. Yet, another problem often arises in connecting a downspout to a drainage extension. Although the drainage extension has a connection of proper cross-section to connect with a downspout having a similar cross-section, the dimensions of the connector on the drainage extension do not match the dimensions of the connector on the downspout. This patent does not address this problem. In this respect, it would be desirable if a device that is attached to a downspout were provided that adapts a downspout having a cross-section of one set of dimensions to a drainage extension having a similar cross-section but having a different set of dimensions from the downspout.

Each of closely related U.S. Pat. Nos. 5,813,701, 5,915,735, 6,041,825, and 6,223,777 discloses a repositionable flexible downspout extension. One end of the downspout extension has a first rectangular connector for fitting onto a downspout that has a first size, and the other end of the downspout extension has a second rectangular connector for fitting onto a downspout that has a second size. However, in order to use one end of the downspout extension for connection to the downspout and to use the other end of the downspout extension for connection to another extension to provide an overall extension having a desirable length, it is necessary to cut off a portion of the other end of the extension to provide a portion of the extension that is suitable for connection to another extension. For purposes of simplicity of use, it would be desirable if a downspout extension were provided that has one extension end which has the capability for selectively connecting with either a first size downspout or a second size downspout. Also, in order to preclude the need for cutting off a portion of an extension end to enable that extension end to be connected to another extension, it would be desirable if a downspout extension were provided which includes another extension end which is adapted to connect with another extension without the need for cutting off a portion of an extension end.

Japan 52043126 discloses a plastic elbow for a rain trough that has two ends, each of which having fixed dimensions for connection to a dimension-compatible connector. The elbow can be bent in a variety of different orientations.

Great Britain 1,584,365 discloses a pipe connection that has two ends, each of which having fixed dimensions for connection to a dimension-compatible connector.

Still other features would be desirable in a flexible downspout connector apparatus. For example, for purposes of simplicity of manufacture and use, when a plurality of flexible downspout extensions are connected together to form a combined lengthy extension, it would be desirable if each of the flexible extensions employed were interchangeable with each other. In this way, only one type of flexible extension need be manufactured.

Moreover, with each interchangeable flexible extension, it would be desirable if each interchangeable flexible extension could be connected with a downspout.

In addition, it would be desirable if each interchangeable flexible extension could be connected with either a first size downspout or a second size downspout.

Thus, while the foregoing body of prior art indicates it to be well known to use flexible extensions for downspouts, the prior art described above does not teach or suggest a flexible downspout connector apparatus which has the following combination of desirable features: (1) has rigid features to help prevent cuts and tears of the downspout extension; (2) has the capability to be adapted to downspouts having different dimensions; (3) provides a downspout extension that is rigid enough to withstand cuts and tears and, at the same time, is flexible enough to be swung around the downspout without the need for a pivotal connection between the extension and the downspout; (4) provides an adapter for fitting a downspout having a cross-sectional shape having one set of dimensions to a downspout extension having a similar cross-sectional shape but having a different set of dimensions from the downspout; (5) provides a downspout extension that has one extension end which has the capability for selectively connecting with either a first size downspout or a second size downspout; (6) provides a downspout extension which includes another extension end which is adapted to connect with another extension without the need for cutting off a portion of an extension end; (7) when a plurality of flexible downspout extensions are connected together to form a combined lengthy extension, it provides plural flexible extensions which are interchangeable with each other; (8) each interchangeable flexible extension can be connected with a downspout; (9) each interchangeable flexible extension can be connected with either a first size downspout or a second size downspout; and (10) enables a flexible extension to be connected with either a first size downspout or a second size downspout by either leaving first and second size adapters telescopingly nested together at one end the flexible extension, or selectively releasably removing the second size adapter from its telescopically nesting relation with the first size adapter. The foregoing desired characteristics are provided by the unique flexible downspout connector apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, comprises a flexible downspout connector apparatus including a flexible extension pipe, a first adapter member and a second adapter member, both nested together at one end of the pipe. The first adapter member includes a connection portion for connecting to a downspout outlet end of a first size, and the second adapter member includes a connection portion for connecting to a downspout outlet of a second size. The second adapter member is releasably telescoped with respect to the second adapter member and may be left in place or easily removed at the option of the user to accommodate for different downspout outlet end sizes.

Preferably, adapter-to-adapter releasable locking means are connected between the second adapter member and the first adapter member for releasably locking the second adapter member to the first adapter member. In this respect, the adapter-to-adapter locking means can include a first locking portion on the second adapter member and a second locking portion on the first adapter member for releasable engagement with the first locking portion.

The first locking portion includes a convex first locking member, and the second locking portion includes a second locking member which includes an inside concave portion for receiving the convex first locking member.

The second locking portion alternatively includes a plurality of clamping claws that are connected to an outer convex portion of the first adapter member. Preferably, the clamping claws are located at corner portions of the second adapter member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved flexible downspout connector apparatus which has all of the advantages of the prior art and none of the disadvantages.

It is another object of the present invention to provide a new and improved flexible downspout connector apparatus which may be easily and efficiently manufactured and marketed.

It is a further object of the present invention to provide a new and improved flexible downspout connector apparatus which is of durable and reliable construction.

An even further object of the present invention is to provide a new and improved flexible downspout connector apparatus which is susceptible of a low cost of manufacture with regard to both materials and labor, and which accordingly is then susceptible of low prices of sale to the consuming public, thereby making such flexible downspout connector apparatus available to the buying public.

Still yet a further object of the present invention is to provide a new and improved flexible downspout connector apparatus which has rigid features to help prevent cuts and tears of the downspout extension.

Still another object of the present invention is to provide a new and improved flexible downspout connector apparatus that has the capability to be adapted to downspouts having different dimensions.

Yet another object of the present invention is to provide a new and improved flexible downspout connector apparatus which provides a downspout extension that is rigid enough to withstand cuts and tears and, at the same time, is flexible enough to be swung around the downspout without the need for a pivotal connection between the extension and the downspout.

Even another object of the present invention is to provide a new and improved flexible downspout connector apparatus that provides an adapter for fitting a downspout having a cross-sectional shape having one set of dimensions to a downspout extension having a similar cross-sectional shape but having a different set of dimensions from the downspout.

Still a further object of the present invention is to provide a new and improved flexible downspout connector apparatus which provides a downspout extension that has one extension end which has the capability for selectively connecting with either a first size downspout or a second size downspout.

Yet another object of the present invention is to provide a new and improved flexible downspout connector apparatus that provides a downspout extension which includes another extension end which is adapted to connect with another extension without the need for cutting off a portion of an extension end.

Still another object of the present invention is to provide a new and improved flexible downspout connector apparatus which, when a plurality of flexible downspout extensions are connected together to form a combined lengthy extension, provides plural flexible extensions which are interchangeable with each other.

Yet another object of the present invention is to provide a new and improved flexible downspout connector apparatus in which each interchangeable flexible extension can be connected with a downspout.

Still a further object of the present invention is to provide a new and improved flexible downspout connector apparatus in which each interchangeable flexible extension can be connected with either a first size downspout or a second size downspout.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a first embodiment of the flexible downspout connector apparatus of the invention.

FIG. 2 is a top view of the embodiment of the flexible downspout connector apparatus shown in FIG. 1 taken along line 2-2 of FIG. 1.

FIG. 8 is a side view of a portion of a second embodiment of the invention connected to a downspout.

FIG. 9 is a partially exploded perspective view of the second embodiment of the invention shown in FIG. 8, removed from the downspout.

DESCRIPTION OF THE PREFERRED EMBODIMENT

Figure 3:
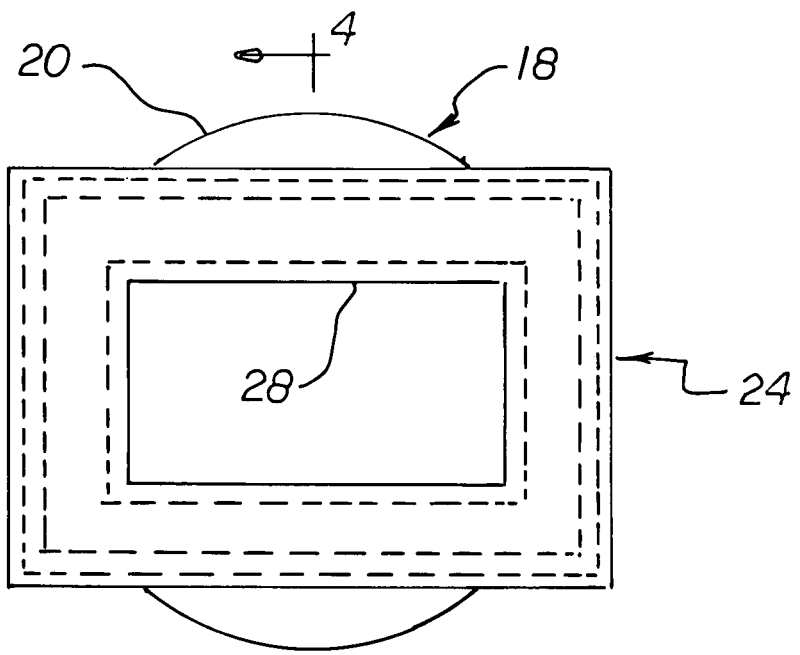
FIG. 3 is a front view of the embodiment of the flexible downspout connector apparatus of FIG. 1 taken along line 3-3 thereof.
Figure 4:
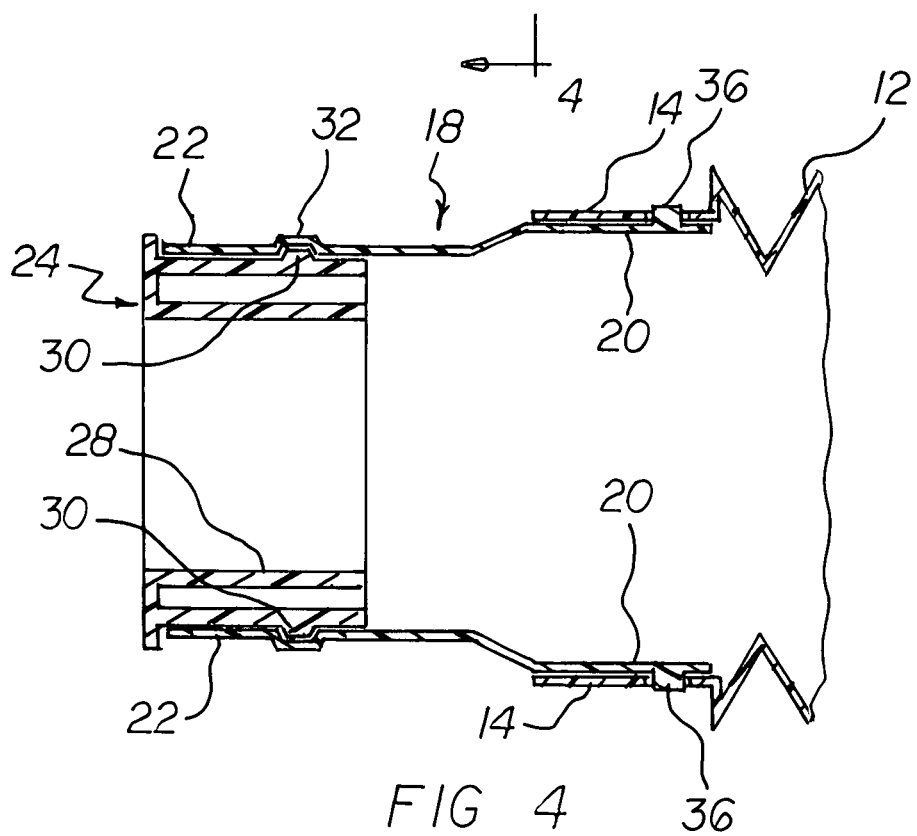
FIG. 4 is a cross-sectional view of the embodiment of the invention of FIG. 3, taken along line 4-4 thereof.
Figure 5:
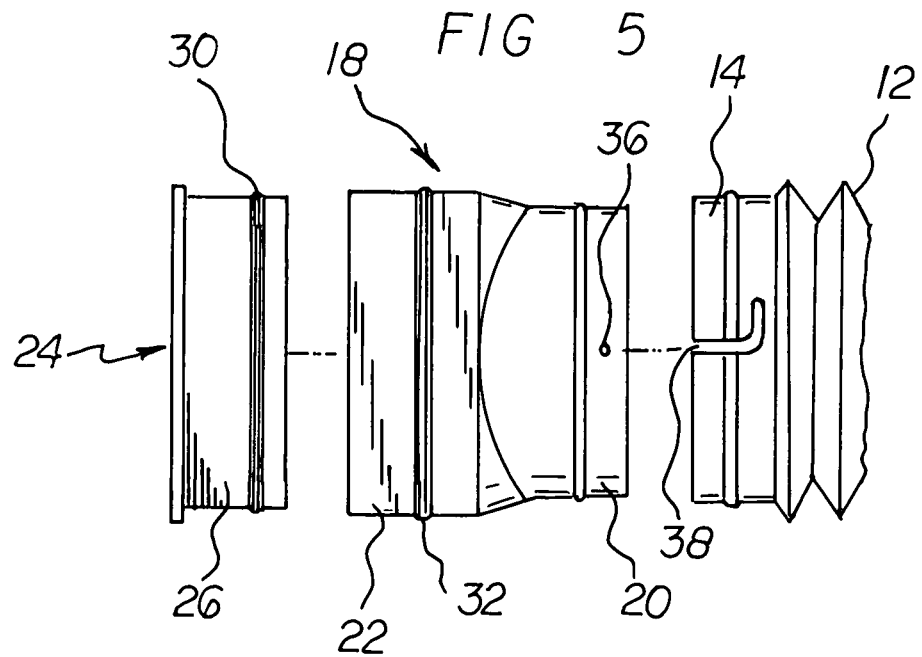
FIG. 5 is a partially exploded top view of the embodiment of the invention shown in FIG. 4.
Figure 6:
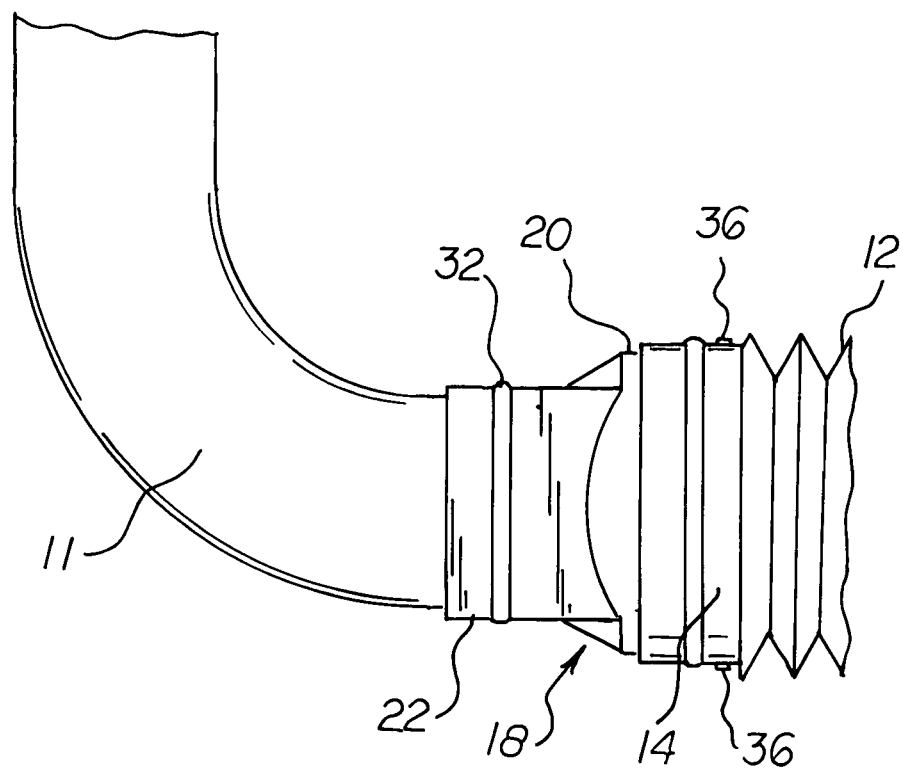
FIG. 6 is a side view of the embodiment of the invention shown in FIG. 5, shown without second adapter member 24, which is connected to a downspout.
Figure 7:
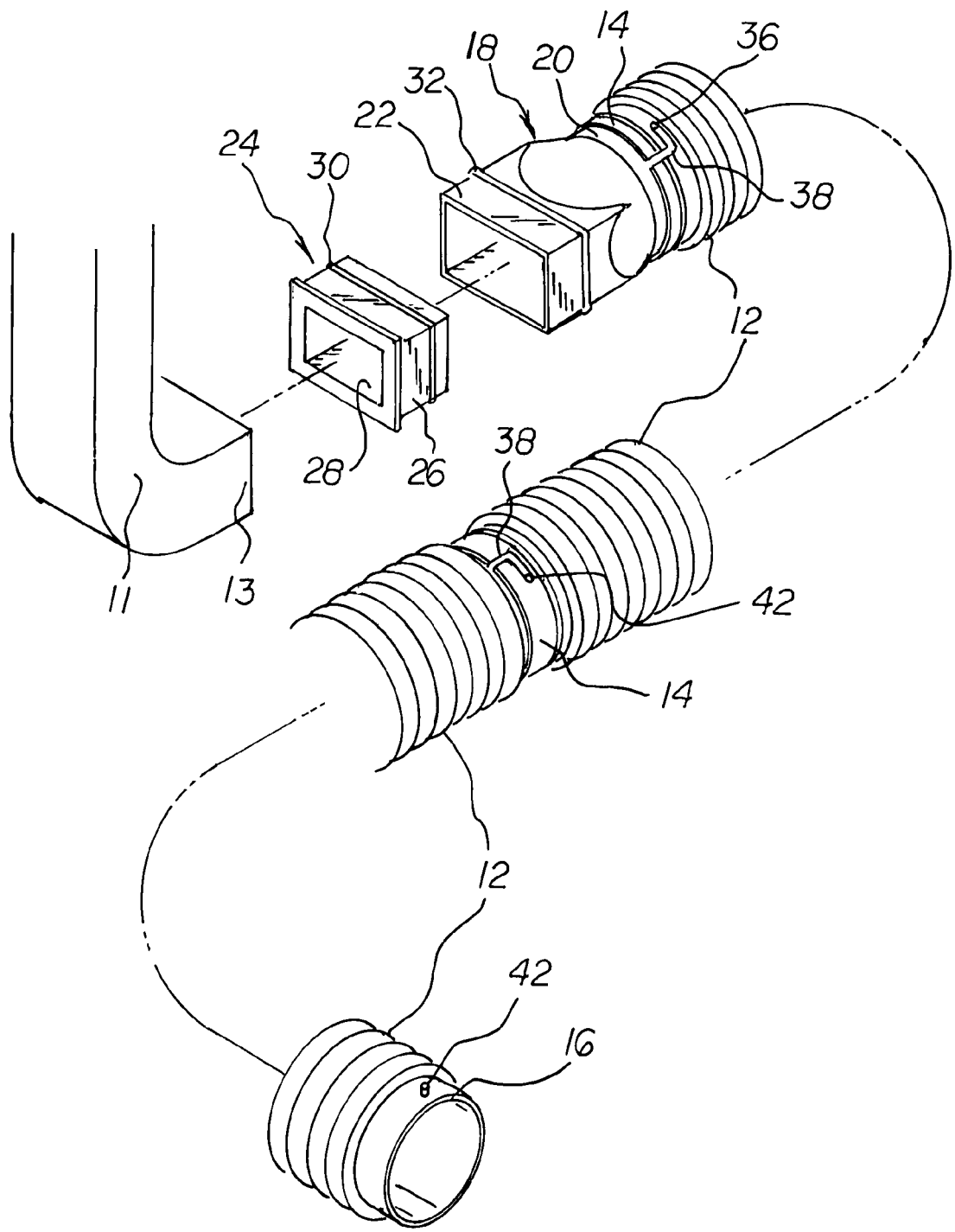
FIG. 7 an exploded perspective view of the first embodiment of the invention with a second flexible extension connected to a first flexible extension.
Figure 10:
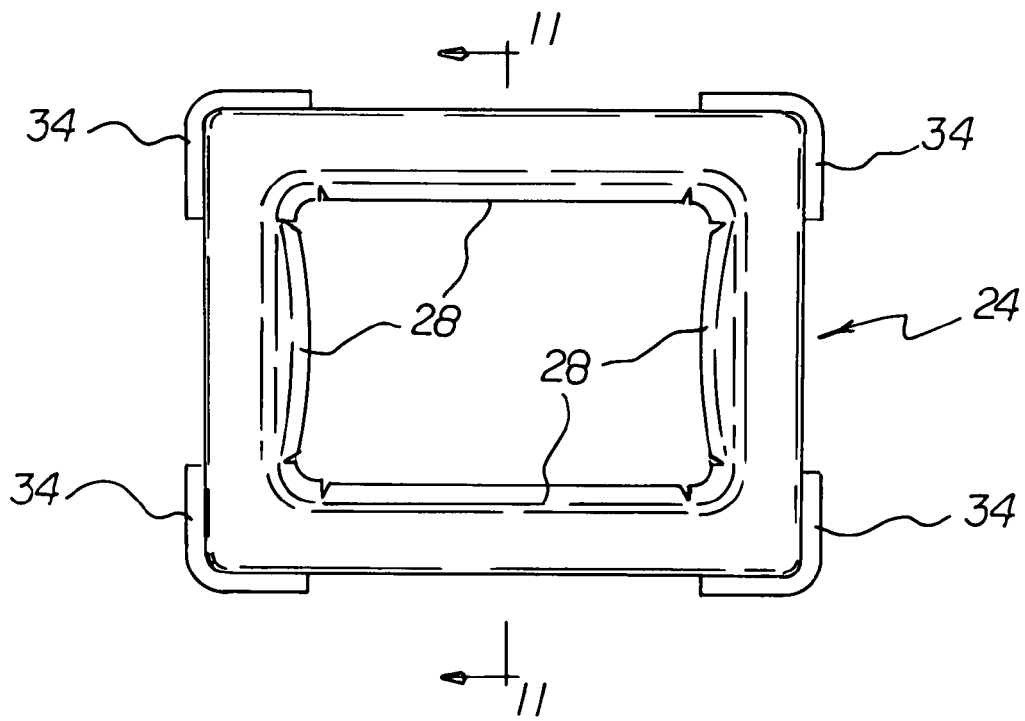
FIG. 10 is a front view of the embodiment of the invention shown in FIG. 9, taken along line 10-10 thereof.
Figure 11:
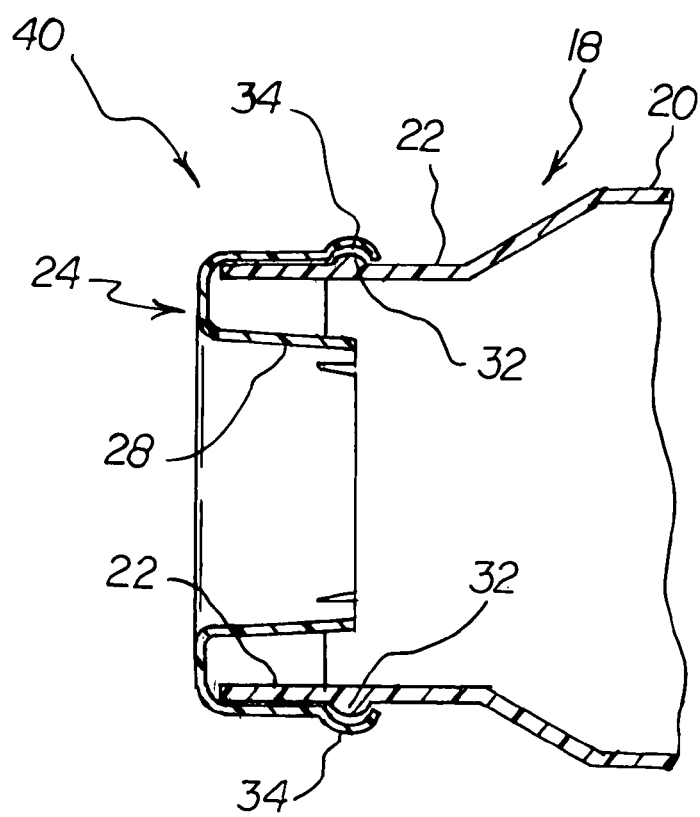
FIG. 11 is a cross-sectional view of the embodiment of the invention shown in FIG. 10, taken along line 11-11 thereof.

With reference to the drawings, a new and improved flexible downspout connector apparatus embodying the principles and concepts of the present invention will be described.

Turning to FIGS. 1-7, there is shown a first embodiment of the flexible downspout connector apparatus of the invention generally designated by reference numeral 10. In the first embodiment, flexible downspout connector apparatus 10 includes a flexible extension pipe 12 which includes a first pipe connector 14 located at a first end of the flexible extension pipe 12 and which includes a second pipe connector 16 located at a second end of the flexible extension pipe 12. A central portion of pipe 12 includes the usual conventional corrugations that enable the pipe to be flexible and to assume a wide variety of bent shapes. A first adapter member 18 includes an adapter-to-pipe connector portion 20 at one end of the first adapter member 18 and includes a first-size adapter connector portion 22 located at a second end of the first adapter member 18. A second adapter member 24 includes an adapter-to-adapter connector portion for connecting with the first-size adapter connector portion 22 and includes a second-size adapter connector portion for connecting with a downspout 11.

In the first embodiment 10 of the invention shown in FIGS. 1-7, the first-size adapter connector portion 22 is rectangular in shape and fits directly and telescopically onto a downspout 11 that has a first-size rectangular outlet end. More specifically, when a downspout 11 that has a first-size rectangular outlet end is employed, the second adapter member 24 can be removed from the first adapter member 18 and set aside, and the first-size adapter connector portion 22 of the first adapter member 18 can be fitted directly onto the downspout 11 that has the first-size rectangular outlet end.

More specifically, conventional downspouts usually are available in one of two standard sizes. Thus, a conventional first-size rectangular outlet end of a downspout 11 has the following approximate dimensions: 4.28 inches by 3.28 inches. In addition, a conventional second-size rectangular outlet end of a downspout 11 has the following approximate dimensions: 3.25 inches by 2.25 inches. In this respect, the first-size adapter connector portion 22 of the invention has dimensions slightly larger than the conventional first-size rectangular outlet end of a downspout 11; and the downspout reception opening defined by the planar, resilient connecting walls 28 of the second adapter member 24 has dimensions slightly larger than the conventional second-size rectangular outlet end of a downspout 11. In this way, the downspout connecting portions of the first adapter member 18 and the second adapter member 24 are capable of fitting snugly onto the outlet end of a downspout 11 of corresponding albeit different size, respectively, at the option of the user.

Thus, substantially as shown in FIGS. 1-7, the adapter-to-adapter connector portion 26 is rectangular in shape and normally fits or nests telescopically into or with the first-size adapter connector portion 22 which also is rectangular in shape, and the second-size adapter connector portion fits telescopically onto a downspout 11 having a second-size rectangular outlet end 13. If a downspout outlet however, has a first-size rectangular outlet end (i.e. larger), the adapter 24 easily may be telescopically removed from its nesting position relative to first adapter member 18, and the first size adapter connector portion 22 may be employed to connect pipe 12 directly to downspout 11 having the first-size rectangular outlet end. On the other hand, if the downspout 11 has a second-size rectangular outlet end (i.e. smaller), adapter 24 is left in its telescopic nesting relation with respect to adapter 18 and the second-size adapter connection portion defined by connecting walls 28 of 10 adapter 24 may be used to connect pipe 12 to downspout 11 having the second-size rectangular outlet end. In this regard, preferably, the second-size adapter connector portion includes planar, resilient connecting walls 28 for fitting tightly against a downspout 11 which has a second size which approximates the second-size adapter connector portion.

In addition, the first pipe connector 14 of one flexible extension pipe 12 is connectable to the second pipe connector 16 of a second flexible extension pipe 12.

Preferably, adapter-to-adapter locking means are provided between the second adapter member 24 and the first adapter member 18 for releasably locking the second adapter member 24 to the first adapter member 18 when they are telescoped together. In this respect, the adapter-to-adapter locking means can include a first locking portion on the adapter-to-adapter connector portion 26 and a second locking portion on the first-size adapter connector portion 22 for connecting with the first locking portion.

With the first embodiment of the invention, the first locking portion includes a convex first locking member 30, and the second locking portion includes a second locking member 32 which includes an inside concave portion for receiving the convex first locking member 30. Preferably, the convex first locking member 30 and the inside concave portion of the second locking member 32 interconnect with a snap-fit action.

In each of the figures, reference numerals are shown that correspond to like reference numerals that designate like elements shown in other figures.

In the second embodiment 40 of the invention shown in FIGS. 8-11, the second locking portion includes a plurality of clamping claws 34 that are connected to the adapter-to-adapter connector portion 26 for interconnecting with an outer convex portion of the second locking member 32. Preferably, the clamping claws 34 and the outer convex portion of the second locking member 32 interconnect with a snap fit action. Preferably, the clamping claws 34 are located at corner portions of the second adapter member 24 substantially as illustrated.

Figure 12:
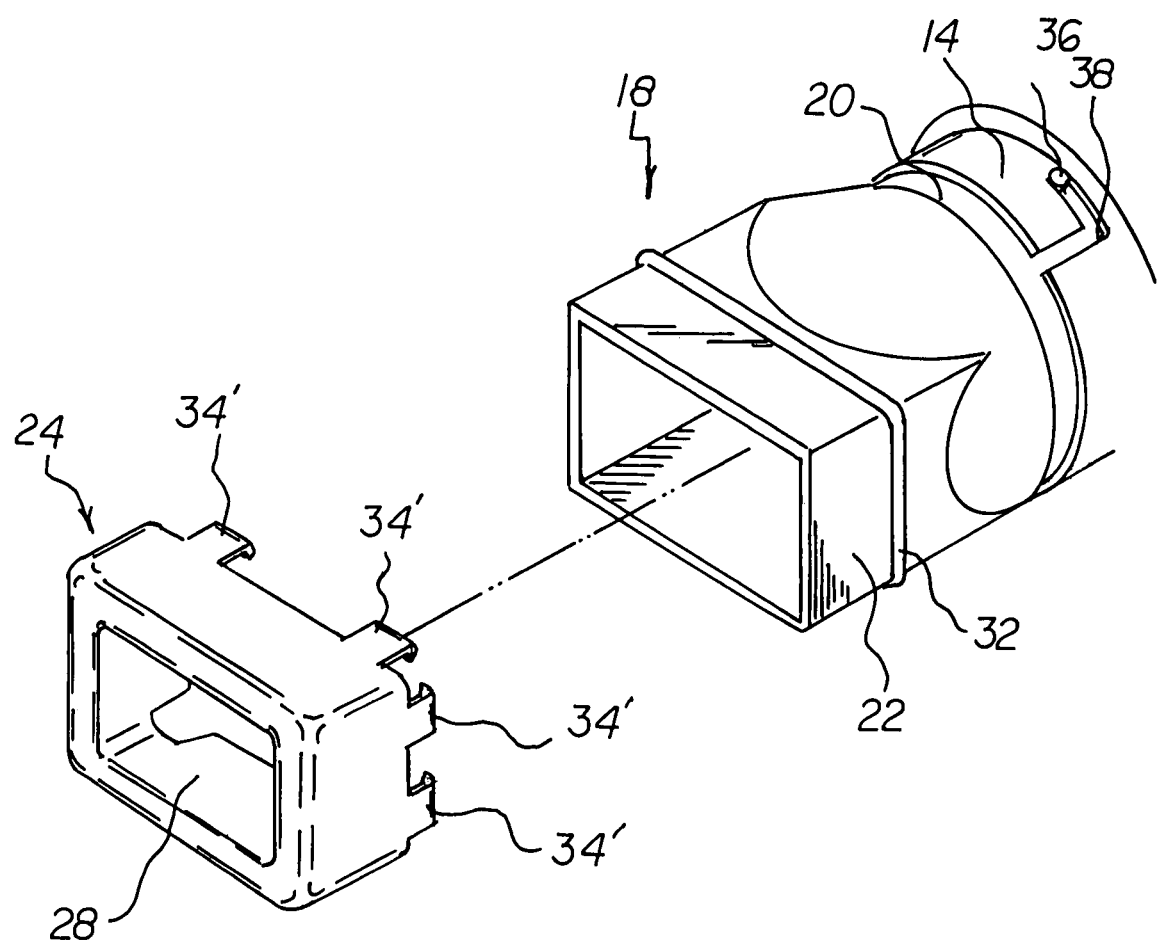
FIG. 12 is a partially exploded perspective view of the third embodiment of the invention showing the clamping jaws alternatively located on the sides of the second adaptor member spaced inward from the corners thereof.

In still a third embodiment of the invention, illustrated in FIG. 12, there is shown an alternative arrangement where the clamping claws 34' may be located on the second adaptor member 24 on each outer rectangular side thereof displaced inwardly from the corner portions thereof. As in the second embodiment, the clamping claws 34' and the outer convex portion of the second locking member 32 preferably interconnect with a snap fit action.

Preferably, extension-to-adapter locking means are connected between the first pipe connector 14 and the adapter-to-pipe connector portion 20. More specifically, the extension-to-adapter locking means can include one or more adapter-mounted locking pins 36 connected to the adapter-to-pipe connector portion 20 and one or more locking-pin-reception channels 38 formed in the first pipe connector 14 for receiving the adapter-mounted locking pin 36.

Preferably, each locking-pin-reception channel 38 has a longitudinal channel portion and a transverse channel portion connected to the longitudinal channel portion.

In operation, to lock the adapter-to-pipe connector portion 20 to the locking-pin-reception channel 38, the first pipe connector 14 is moved up on the adapter-to-pipe connector portion 20, and the longitudinal channel portion is placed in registration with the adapter-mounted locking pin 36. Then, the first pipe connector 14 is pushed longitudinally toward the first-size adapter connector portion 22 so that the adapter-mounted locking pin 36 advances along the longitudinal channel portion until the adapter-mounted locking pin 36 reaches the transverse channel portion.

Then, the first pipe connector 14 is twisted or rotated transversely around the longitudinal axis of the first adapter member 18 so that the adapter-mounted locking pin 36 advances up into the transverse channel portion. When the adapter-mounted locking pin 36 reaches the end of the transverse channel portion, the first pipe connector 14 and the flexible extension pipe 12 are locked onto the adapter-to-pipe connector portion 20 and the first adapter member 18. To disconnect the flexible extension pipe 12 from the first adapter member 18, the reverse of the installation steps are carried out.

Preferably, extension-to-extension locking means are connected between a first flexible extension pipe 12 and a second flexible extension pipe 12. The extension-to-extension locking means can include an extension-mounted locking pin 42 connected to the second pipe connector 16 on the first flexible extension pipe 12. A locking-pin-reception channel 38 is formed in a first pipe connector 14 in the second flexible extension pipe 12 for receiving the extension-mounted locking pin 42 of the first flexible extension pipe 12.

To add a first flexible extension pipe 12 to a second flexible extension pipe 12, the first pipe connector 14 of the second flexible extension pipe 12 is placed on the second pipe connector 16 of the first flexible extension pipe 12. Then, the first pipe connector 14 of the second flexible extension pipe 12 is advanced toward the extension-mounted locking pin 42 on the first flexible extension pipe 12. The extension-mounted locking pin 42 of the first flexible extension pipe 12 is advanced into the longitudinal channel portion of the locking-pin-reception channel 38 of the second flexible extension pipe 12 until it reaches the transverse channel portion of the locking-pin-reception channel 38. Then, the second flexible extension pipe 12 is twisted or rotated around the longitudinal axis of the first flexible extension pipe 12 so that the extension-mounted locking pin 42 of the first flexible extension pipe 12 advances to the end of the transverse channel portion of the locking-pin-reception channel 38. In this way, the second flexible extension pipe 12 is locked onto the first flexible extension pipe 12. To disconnect the second flexible extension pipe 12 from the first flexible extension pipe 12, the steps of the connection process are carried out in reverse.

The components of the flexible downspout connector apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved flexible downspout connector apparatus that is low in cost, relatively simple in design and operation, and which advantageously has rigid features to help prevent cuts and tears of the downspout extension. With the invention, a flexible downspout connector apparatus is provided which has the capability to be adapted to downspouts having different dimensions. With the invention, a flexible downspout connector apparatus provides a downspout extension that is rigid enough to withstand cuts and tears and, at the same time, is flexible enough to be swung around the downspout without the need for a pivotal connection between the extension and the downspout. With the invention, a flexible downspout connector apparatus provides an adapter for fitting a downspout having a cross-sectional shape having one set of dimensions to a downspout extension having a similar cross-sectional shape but having a different set of dimensions from the downspout. With the invention, a flexible downspout connector apparatus provides a downspout extension that has one extension end which has the capability for selectively connecting with either a first size downspout or a second size downspout. With the invention, a flexible downspout connector apparatus provides a downspout extension which includes another extension end which is adapted to connect with another extension without the need for cutting off a portion of an extension end. With the invention, a flexible downspout connector apparatus is provided which, when a plurality of flexible downspout extensions are connected together to form a combined lengthy extension, provides plural flexible extensions which are interchangeable with each other. With the invention, a flexible downspout connector apparatus is provided in which each interchangeable flexible extension can be connected with a downspout. With the invention, a flexible downspout connector apparatus is provided in which a flexible extension can be connected with either a first size downspout or a second size downspout by either leaving first and second size adapters telescopingly nested together at one end of the flexible extension, or selectively releasably removing the second size adapter from its telescopically nesting relation with the first size adapter.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A flexible downspout connector apparatus, comprising:
   a flexible extension pipe which includes a first pipe connector located at a first end of said flexible extension pipe and which includes a second pipe connector located at a second end of said flexible extension pipe,
   a first adapter member which includes an adapter-to-pipe connector portion at a first end of said first adapter member, the adapter-to-pipe connector portion configured to be releasably nested within the first pipe connector of the flexible extension pipe, and a first-size adapter connector portion located at a second end of said first adapter member, wherein the first-size adapter connector portion includes an outer convex portion, and
   a second adapter member configured to releasably telescopingly connect with said first-size adapter connector portion and which includes a plurality of clamping claws and a second-size adapter connector portion for connecting with a downspout;
   wherein the plurality of clamping claws are configured to interconnect with the outer convex portion to couple the first adapter member to the second adapter member.

2. The apparatus of claim 1 wherein:
   said first-size adapter connector portion is rectangular in shape and configured to fit directly and telescopically onto a downspout having a first-size rectangular outlet end.

3. The apparatus of claim 1 wherein:
   said adapter-to-adapter connector portion is rectangular in shape and fits telescopically into said first-size adapter connector portion, and
   said second-size adapter connector portion fits telescopically onto a downspout having a second-size rectangular outlet end.

4. The apparatus of claim 1 wherein said first pipe connector of the flexible extension pipe is connectable to a pipe connector identical to said second pipe connector of another flexible extension pipe.

5. The apparatus of claim 1 wherein the second adapter member includes outer walls, and wherein said second-size adapter connector portion includes planar, resilient connecting walls for fitting tightly against a downspout that are interior to the outer walls of the second adapter member.

6. The apparatus of claim 1 wherein said clamping claws are located at corner portions of said second adapter member.

7. The apparatus of claim 1, further including:
   extension-to-adapter locking means connected between said first pipe connector and said adapter-to-pipe connector portion.

8. The apparatus of claim 7 wherein said extension-to-adapter locking means includes:
   an adapter-mounted locking pin connected to said adapter-to-pipe connector portion, and
   a locking-pin-reception channel formed in said first pipe connector for receiving said adapter-mounted locking pin.

9. The apparatus of claim 8 wherein said locking-pin-reception channel has a longitudinal channel portion and a transverse channel portion connected to said longitudinal channel portion.

10. The apparatus of claim 1, wherein the flexible extension pipe is a first flexible extension pipe, and the apparatus of claim 1 further includes:
   a second flexible extension pipe, and
   extension-to-extension locking means connected between the first flexible extension pipe and the second flexible extension pipe.

11. The apparatus of claim 10 wherein said extension-to-extension locking means includes:
   an extension-mounted locking pin connected to said second pipe connector on said first flexible extension pipe, and
   a locking-pin-reception channel formed in a first pipe connector in said second flexible extension pipe for receiving said extension-mounted locking pin of said first flexible extension pipe.

12. The apparatus of claim 1 wherein said second adapter member comprises a rectangular-shaped portion and said clamping claws are located on sides of said rectangular-shaped portion spaced inwardly from corner portions thereof.

* * * * *